EDWARD H. ASHCROFT.
Improvement in Steam-Pressure Gauges.

No. 126,247.  Patented April 30, 1872.

Witnesses
S. N. Piper
J. R. Snow

E. H. Ashcroft.
by his attorney,
R. Eddy

UNITED STATES PATENT OFFICE.

EDWARD H. ASHCROFT, OF LYNN, MASSACHUSETTS.

IMPROVEMENT IN STEAM-PRESSURE GAUGES.

Specification forming part of Letters Patent No. 126,247, dated April 30, 1872.

*To all persons to whom these presents may come:*

Be it known that I, EDWARD H. ASHCROFT, of Lynn, of the county of Essex and State of Massachusetts, have invented a new and useful Improvement in Steam-Pressure Gauges or Meters; and do hereby declare the same to be fully described in the following specification and represented in the accompanying drawing, of which—

Figure 1:
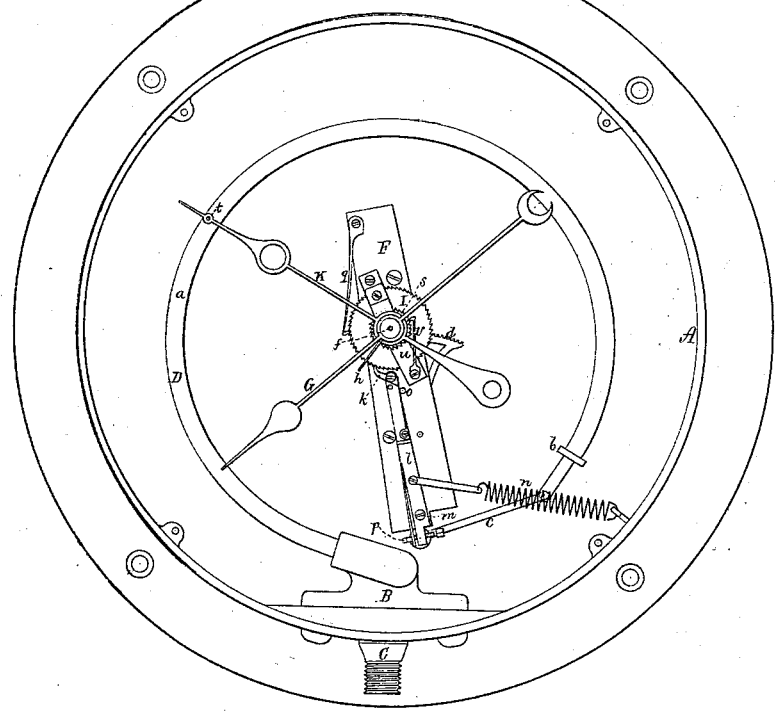
Figure 2:
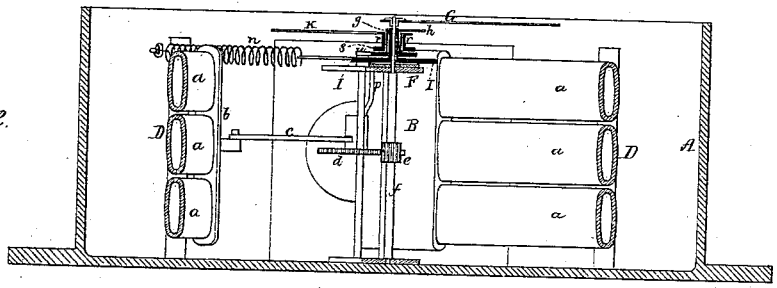
Figure 3:
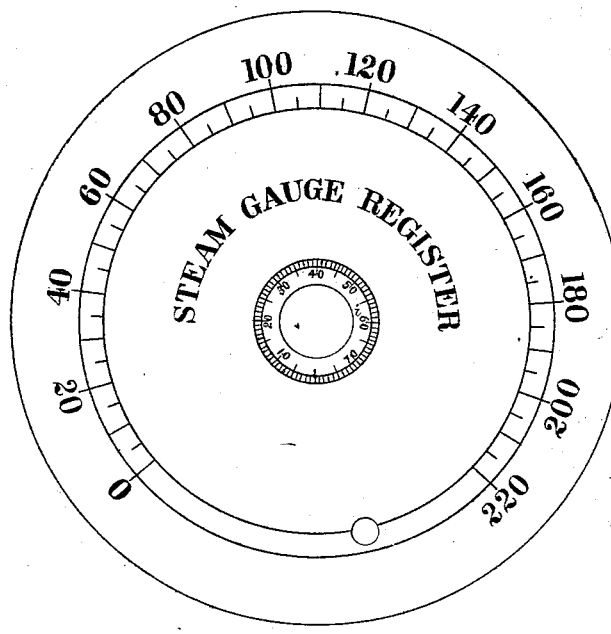

Figure 1 denotes a top view of one of my improved steam-pressure meters or gauges with its dial-plate removed. Fig. 2 is a diametric section of it. Fig. 3 is a view of the dial-plate.

This invention relates to that class of steam-gauges which are arranged to indicate the pressure that obtains within the generator to which they are attached, and at the same time to record any excess of pressure above the amount which the person in attendance may be allowed to carry; and it consists in combining, with a series of Bourdon tubes or expanders, a registering mechanism, to be operated by said tubes, as will be more fully explained hereinafter.

In constructing gauges of this character I use a case, A, which is provided with a hollow abutment or chamber, B, which is supplied with an induction-pipe, C, and is firmly secured to the case A. From this chamber the Bourdon expander D is extended, it being composed in this instance of a series of flattened tubes, $a\ a\ a$, each bent around in the arc of a circle, and fastened at its free end to a T-piece, $b$. Each of said tubes at its fast end opens into the chambered abutment B, it being closed at its free end. A gauge, the expanding or yielding portion of which is composed of a series of tubes, is far preferable to one made of a single tube, as it is stronger and not as liable to being expanded and burst open laterally, and is more uniform in action, and will retain its elasticity or power of contraction to better advantage. To an arm of the T-piece a connecting-rod, $c$, is pivoted, and also to a sectoral gear-lever, $d$, whose arc of teeth engages with a pinion, $e$, fixed on a shaft, $f$, arranged at the center of the case A, and pivoted in a frame, F, disposed in such case, as shown. An index-pointer, G, is fixed on the outer end of the shaft $f$, and serves to indicate on the dial the amount of variations of the steam pressure from time to time. On the outside of the frame F there is a ratchet-wheel, I, fixed upon a short tubular shaft, $g$, arranged concentrically on the shaft $f$. There is fixed on the outer end of the shaft $g$ a short index-pointer, $h$, to operate with the inner circular scale of divisions of the dial-plate, such scale being for determining the number of times the pressure has been carried beyond the limit allowed by the proper authorities. The ratchet-wheel I is worked by a spring-click or pawl, $k$, which is carried by a lever, $l$, arranged on top of the frame F and in the prolongation of the diameter of the ratchet, the fulcrum of such lever being shown at $m$. A spring, $n$, connected with the case A and the longer arm of the lever, serves to draw such arm toward and against the stop $o$. A retaining pawl, $q$, is applied to the ratchet-wheel I and the frame F for the purpose of preventing the backward movement of said wheel. Surrounding the tubular shaft $g$ there is another shaft, $r$, which carries a ratchet-wheel, $s$, and a long index-pointer, K, arranged under the main pointer G, or between it and the dial, the pointer K being provided with a stud to extend outward beyond the pointer G, so that the one, K, may be moved by it. The ratchet-wheel $s$ rests upon a yoke, $u$, which projects from the frame F outside of the ratchet-wheel I, said yoke having a retaining pawl, $v$, fixed to it to prevent the backward movement of the index-pointer K, which is operated by G, and serves to indicate upon the dial the extent of movement of the latter, and thus register the highest point to which the pressure has been carried in any given length of time.

I am aware that recording pressure-gauges have heretofore been made which would indicate the differences of pressure and at the same time register the number of times that there had been an excess of pressure over that which the person in attendance was allowed to carry; and that these have been so combined in one machine as to produce the result described. I do not, therefore, claim, broadly, the combining of these two instruments in one; but

Having thus described the Bourdon gauge and my improved mechanism, and the manner of combining the two, what I do claim, and desire to secure by Letters Patent, is—

The combination of two or more tubes of a Bourdon gauge with the registering mechanism of such gauge, the parts being constructed substantially as described, and arranged to be operated by the tubes, as shown.

EDWARD H. ASHCROFT.

Witnesses:
S. N. PIPER,
J. R. SNOW.